United States Patent
Koelewyn

[11] Patent Number: 5,862,552
[45] Date of Patent: Jan. 26, 1999

[54] MULTI-PURPOSE FISHING PLIERS

[76] Inventor: Robert W. Koelewyn, 110 Birchwood Rd., Fairfield, Conn. 06430

[21] Appl. No.: 724,524

[22] Filed: Sep. 30, 1996

[51] Int. Cl.$^6$ ..................................................... B25B 7/22
[52] U.S. Cl. ..................................... 7/132; 7/133; 81/421
[58] Field of Search ................................ 7/132, 133, 134, 7/159, 107, 125; 81/424, 421, 418, 416

[56] References Cited

U.S. PATENT DOCUMENTS

| | | |
|---|---|---|
| 78,241 | 5/1868 | Single . |
| 428,601 | 5/1890 | Hand . |
| 651,082 | 6/1900 | McClary ..................................... 7/133 |
| 999,739 | 8/1911 | Bernard ...................................... 7/133 |
| 1,396,863 | 11/1921 | Mayhew . |
| 1,452,642 | 4/1923 | Keating ....................................... 7/133 |
| 1,771,733 | 7/1930 | Ott ............................................. 81/9.4 |
| 1,800,447 | 4/1931 | Froeschl . |
| 2,005,694 | 6/1935 | Vosbikian et al. . |
| 2,434,550 | 1/1948 | Daniel . |
| 2,495,667 | 1/1950 | Boyer . |
| 3,220,241 | 11/1965 | Miller ......................................... 7/107 |
| 3,755,894 | 9/1973 | Budrick . |
| 3,778,919 | 12/1973 | Simon . |
| 3,947,905 | 4/1976 | Neff . |
| 4,080,733 | 3/1978 | Clegg . |
| 4,353,240 | 10/1982 | Undin et al. ............................... 81/421 |
| 4,459,717 | 7/1984 | Halstead . |
| 4,559,853 | 12/1985 | Oye . |
| 4,631,855 | 12/1986 | Ader . |
| 4,669,340 | 6/1987 | Igarashi ..................................... 81/416 |
| 4,719,827 | 1/1988 | Igarashi ..................................... 81/416 |
| 4,796,318 | 1/1989 | Bigej ........................................... 7/132 |
| 5,092,074 | 3/1992 | Zincke . |
| 5,207,014 | 5/1993 | Panella . |
| 5,220,856 | 6/1993 | Eggert et al. .............................. 81/416 |
| 5,226,237 | 7/1993 | Rancour et al. . |
| 5,452,705 | 9/1995 | Horng . |

*Primary Examiner*—James G. Smith
*Assistant Examiner*—Lee Wilson
*Attorney, Agent, or Firm*—Ware, Fressola, Van der Sluys & Adolphson LLP

[57] ABSTRACT

A fishing pliers including a pair of gripping jaws having replaceable gripping inserts with progressively finer knurled gripping surfaces, so that the gripping jaws can be used on both small and large objects and for many different tasks. The fishing pliers also include a pair of cutting jaws having replaceable cutting blades with cutting edges. The cutting edges are positioned so that their common cutting line is offset from the pivot axis of the fishing pliers so that the cutting jaws produce both a slicing cutting motion and a compressive cutting motion, making for easier cutting and reducing wear on the cutting blades.

33 Claims, 6 Drawing Sheets

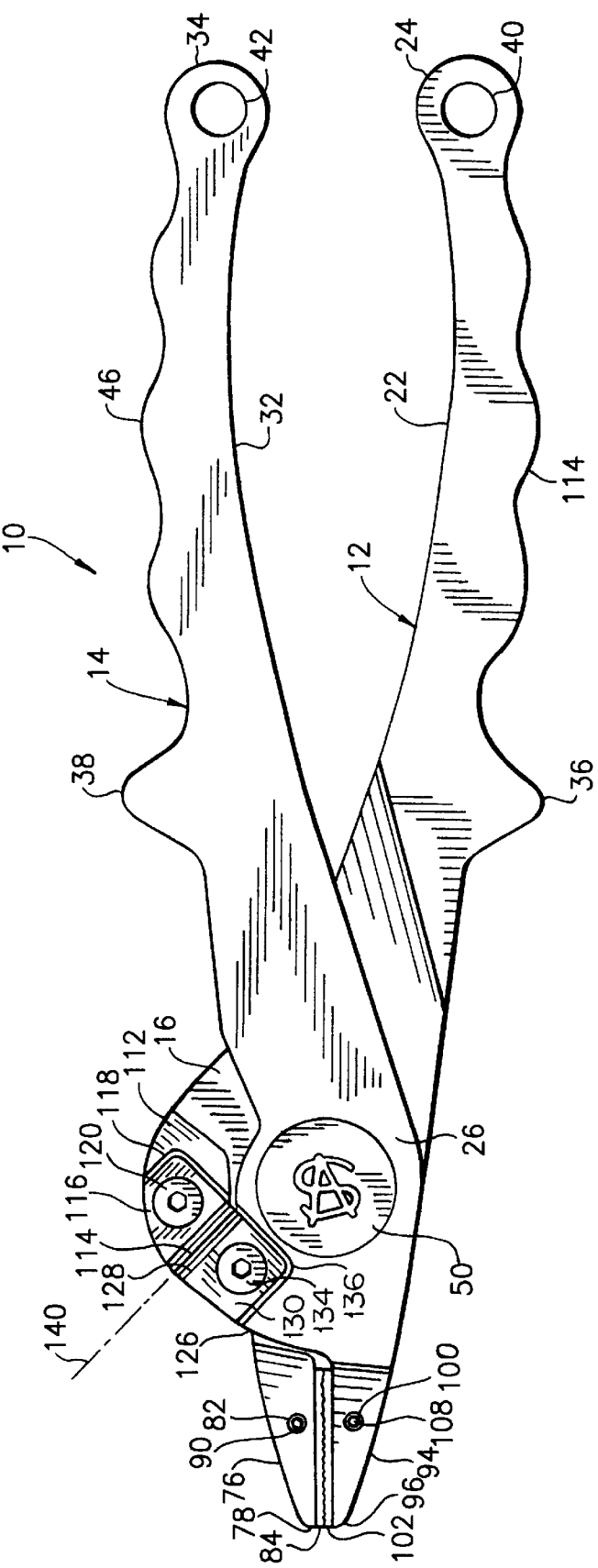

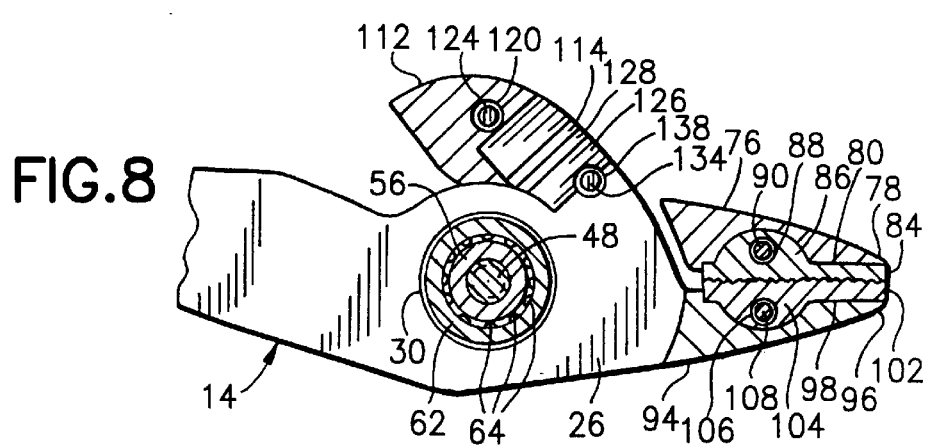
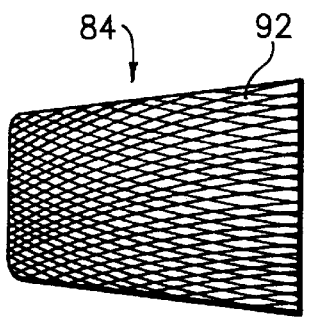
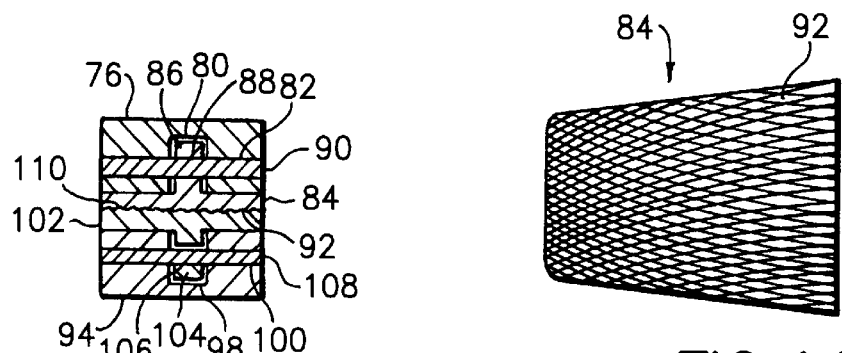
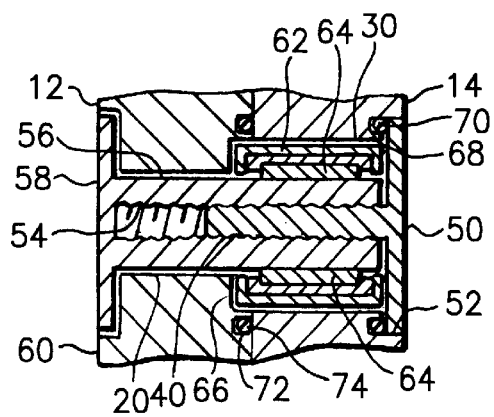

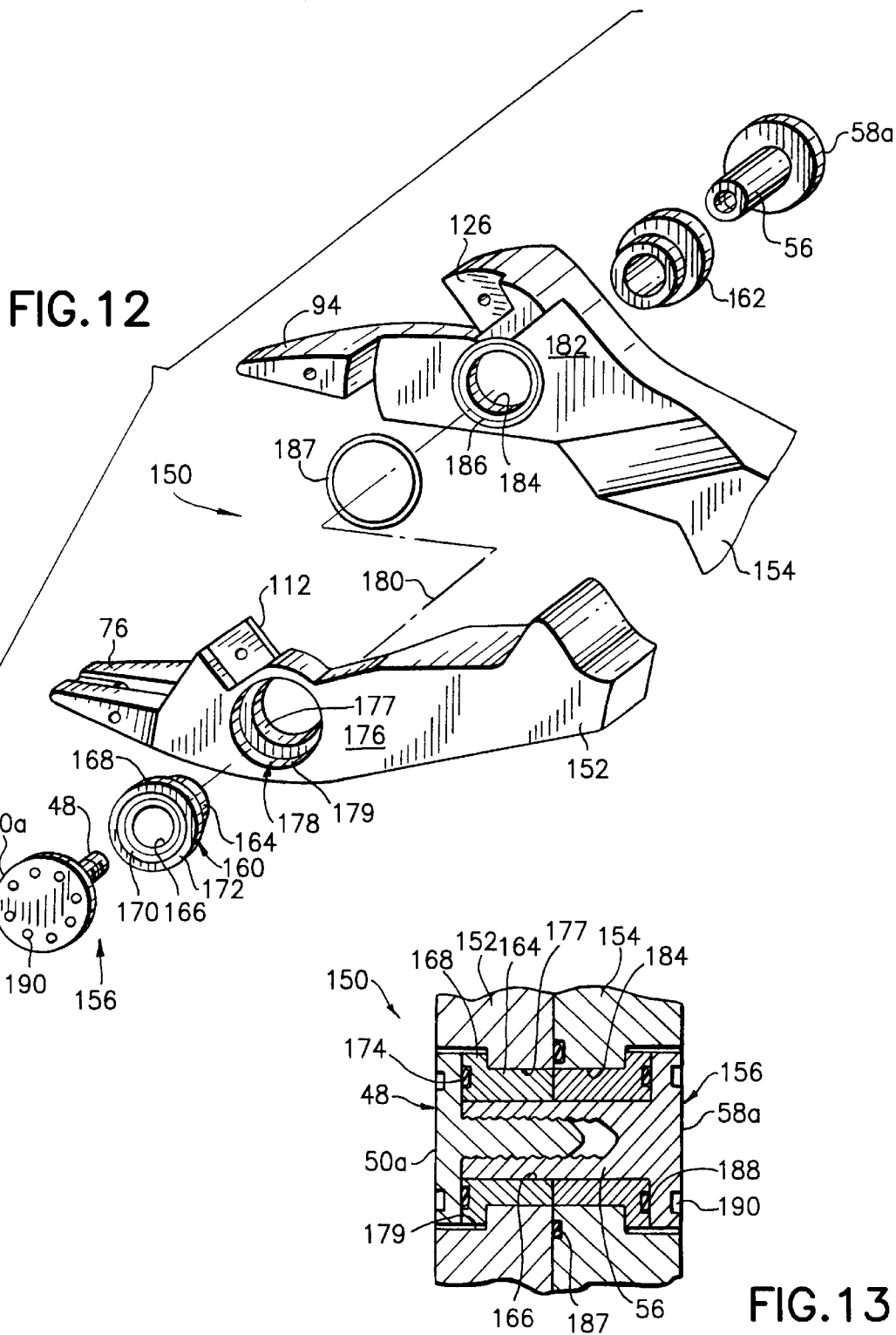

MULTI-PURPOSE FISHING PLIERS

FIELD OF THE INVENTION

The present invention relates to a tool and, more particularly, to a multi-purpose fishing pliers including a pair of gripping jaws having replaceable gripping inserts with progressively finer gripping surfaces, and an offset pair of cutting jaws producing both slicing cutting motion and compressive cutting motion and having replaceable cutting blades.

BACKGROUND OF THE INVENTION

Fishing requires tools for many different tasks including gripping and cutting objects, and fishing exposes tools to harsh conditions such as salt water and dirt. Fishing pliers, in particular, normally include a pair of gripping jaws that are used for many common fishing tasks such as gripping and bending fish hooks, rigging tackle, removing fish hooks from fish, and adjusting fishing lures and jigs, for example. The surfaces of the gripping jaws of many existing fishing pliers are not well adapted to all tasks, and also have a limited useful life and wear out requiring the replacement of the fishing pliers. The gripping surfaces can also rust due to exposure to salt water, for example, again requiring the replacement of the fishing pliers.

Fishing also requires cutters for cutting monofilament fishing line for example. While primarily intended to cut monofilament, however, the cutters are often abused for use in cutting wire or hooks, a practice which leads to rapid dulling of the blades and often cause notches to be formed in the blades such that when attempting to use the cutters for their intended purpose, namely cutting monofilament, the blade become ineffective. In addition, scissor-type cutting jaws normally only produce a compressive cutting force which requires a large squeezing force, making a difficult cut and tending to further dull the cutting blades. Moreover, the harsh environment usually associated with fishing tends to degrade the cutting edges. Many of these drawbacks are found in cutters used for purposes other than fishing, as well.

Fishing pliers and cutters are usually provided as separate tools. There is a need for both improved pliers and improved cutters, and for combining them into a convenient, well-performing tool.

SUMMARY OF THE INVENTION

A general object of the present invention, therefore, is to provide new and improved pliers that can be used for many common fishing tasks as well as other tasks.

A more specific object of the present invention is to provide pliers having replaceable gripping jaw inserts to extend the usable life of the pliers.

Another object of the present invention is to provide pliers including gripping jaw inserts having progressively finer gripping surfaces so that the pliers can be used with both large and small objects.

An additional general object of the present invention is to provide new and improved cutters that can be used for many common fishing tasks as well as other tasks.

Another object of the present invention is to provide cutters having cutting jaws that produce slicing cutting motion as well as compressive cutting motion in order to reduce the total amount of cutting force and to extend the useful life of the cutting blades.

A further object of the present invention is to provide cutters having replaceable cutting blades to extend the usable life of the cutters.

Still another general object of the present invention is to provide pliers combined with cutters in accordance with the foregoing objectives.

An additional object of the present invention is to provide pliers suitable for use in a harsh environment.

A further object of the invention is to provide a pliers or pliers combined with cutters with a smooth accurate pivot action.

In carrying out this invention there is provided a pliers having a first lever arm and a second lever arm. The first lever arm includes an intermediate portion having a pivot axis, and a handle extending from the intermediate portion. The second lever arm is generally complementary to the first lever arm and includes an intermediate portion having a pivot axis, and a handle extending from the intermediate portion. The first and the second lever arms are coupled along their pivot axes for relative pivoting movement between an open position and a closed position.

A first cutting jaw is formed with the intermediate portion of the first lever arm, and has a first cutting edge. A second cutting jaw is formed with the intermediate portion of the second lever arm, generally opposed to the first cutting jaw, and has a second cutting edge. The first and the second cutting edges are placed in butting engagement along a common cutting line when the first and the second lever arms are in a closed position. The first and the second cutting edges are positioned so that their common cutting line is offset from the coupled pivot axes of the first and the second lever arms, whereby both a relative slicing motion and a relative compressive motion are produced between the first and the second cutting edges as the lever arms are moved from opened to closed, reducing the total overall force need to cut objects and reducing wear on the cutting edges.

According to one aspect of the present invention, an imaginary straight line extends from the pivot axes of the first and the second lever arms to a center point of the first and the second cutting edges when the first and the second lever arms are in a closed position, and an angle formed between the common cutting line and the imaginary straight line is about 15° to 55°. In a more particular aspect, the angle is approximately 25°.

According to an additional aspect of the present invention, the first cutting edge is formed as part of a first cutting blade secured to the first cutting jaw, and the second cutting edge is formed as part of a second cutting blade secured to the second cutting jaw. The cutting blades are replaceable to extend the useful life of the pliers.

According to another aspect of the invention, the first and second lever arms are connected by a pivot assembly including a bearing sleeve and bearings, providing stable support of the lever arms and smooth pivoting movement between them.

According to a further aspect of the present invention, the pliers also includes a first gripping jaw extending from the intermediate portion of the first lever arm generally opposite the first handle, and a second gripping jaw extending from the intermediate portion of the second lever arm generally opposite the second handle and complementary to the first gripping jaw. The first gripping jaw has a gripping surface placed in butting engagement with a gripping surface of the second gripping jaw when the first and the second lever arms are in a closed position.

Another pliers according to the present invention is also provided and includes a first lever arm and a second lever arm. The first lever arm includes an intermediate portion having a pivot axis and a handle extending from the intermediate portion, and the second lever arm is similar to the first lever arm and includes an intermediate portion having a pivot axis and a handle extending from the intermediate portion. The first and the second lever arms are coupled along their pivot axis for relative pivoting movement between an open position and a closed position.

A first gripping jaw extends from the intermediate portion of the first lever arm generally opposite the first handle, and a first gripping insert is secured to the first gripping jaw and has a gripping surface. A second gripping jaw extends from the intermediate portion of the second lever arm generally opposite the second handle and is complementary to the first gripping jaw. A second gripping insert is secured to the second gripping jaw and has a gripping surface placed in butting engagement with the gripping surface of the first gripping insert when the first and the second lever arms are in a closed position. The gripping inserts are replaceable to increase the useful life of the pliers.

According to one aspect of the present invention, the first gripping jaw defines a channel extending from the intermediate portion of the first lever arm and also defines a bore generally traverse to and intersecting the channel. The first gripping insert has a spline received within the channel of the first gripping jaw and the spline defines a traverse bore in alignment with the bore defined by the first gripping jaw. A first pin is wedged within the bore of the first gripping jaw and the bore of the spline to secure the first gripping insert to the first gripping jaw.

The second gripping jaw defines a channel extending from the intermediate portion of the second lever arm and also defines a bore generally traverse to and intersecting the channel. The second gripping insert has a spline received within the channel of the second gripping jaw and the spline defines a traverse bore in alignment with the bore defined by the second gripping jaw. A second pin is wedged within the bore of the second gripping jaw and the bore of the spline of the second gripping insert to secure the second gripping insert to the second gripping jaw.

According to another aspect of the present invention, the gripping surfaces of the first and the second gripping inserts are progressively more finely knurled nearer distal ends of the first and the second gripping jaws, whereby the gripping jaws can be used with both large and small objects so that the pliers can be used for many different tasks.

According to a further aspect of the present invention, the pliers also includes a first cutting jaw and a second cutting jaw. The first cutting jaw is formed with the intermediate portion of the first lever arm and has a first cutting edge. The second cutting jaw is formed with the intermediate portion of the second lever arm, generally opposed to the first cutting jaw, and has a second cutting edge. The first and the second cutting edges are in butting engagement along a common cutting line when the first and the second lever arms are in a closed position. The first and the second cutting edges are positioned so that their common cutting line is offset from the coupled pivot axes of the first and the second lever arms, whereby both a relative slicing motion and a relative compressive motion are produced between the first and the second cutting edges as the first and the second lever arms are opened and closed, reducing the total overall force need to cut objects and reducing wear on the cutting edges.

According to additional aspects of the invention, the first and second lever arms are provided with a pivot assembly including press fit bushings providing no-twist support of the lever arms, or roller bearings providing smooth action.

The invention together with further objects, features, advantages and aspects thereof, will be more clearly understood from the following description taken in connection with the accompanying drawings.

BRIEF DESCRIPTION OF THE DRAWINGS

FIG. 2 is a side elevation view of the fishing pliers shown in a closed position;

FIG. 8 is a sectional view, partially cut away, of the fishing pliers taken along the line 8—8 of FIG. 7;

FIG. 9 is an enlarged sectional view, partially cut away, of the fishing pliers taken along the line 9—9 of FIG. 3;

FIG. 10 is an enlarged sectional view, partially cut away, of the fishing pliers taken along the line 10—10 of FIG. 6;

FIG. 11 is an enlarged top view of the gripping surface of the first gripping insert of the fishing pliers;

FIG. 12 is an exploded perspective view, partially cut away, of the lever arms and pivot assembly of another fishing pliers according to the invention herein; and FIG. 13 is a sectional view of the fishing pliers of FIG. 12 taken along the lines 13—13 of FIG. 12.

The same reference numerals refer to the same elements throughout the various figures.

DETAILED DESCRIPTION OF THE INVENTION

Figure 1:
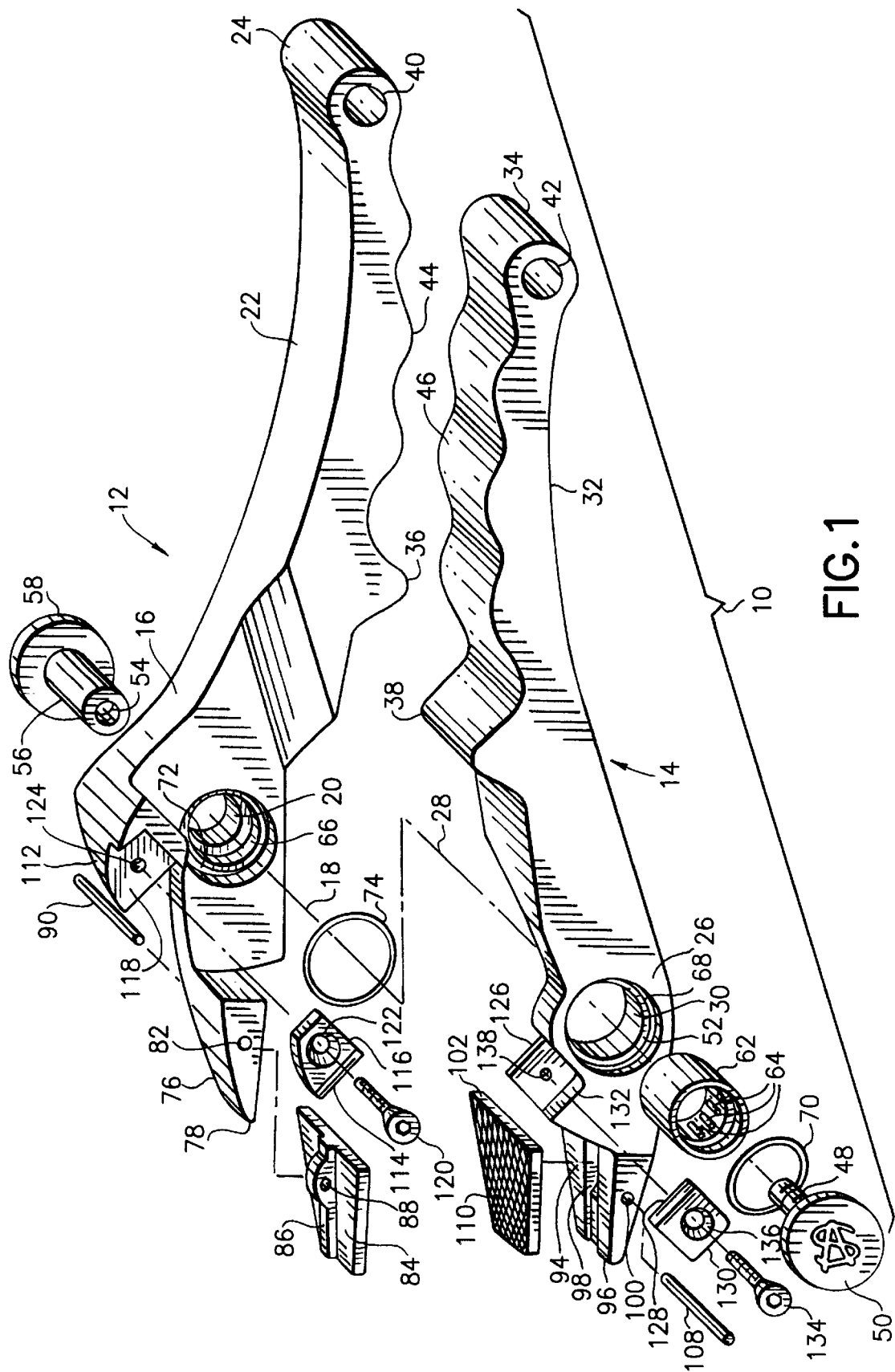
FIG. 1 is an exploded perspective view of a fishing pliers according to the present invention.

Referring to FIGS. 1 through 11, the present invention is directed to a multipurpose fishing pliers 10 having a first lever arm 12 and a second lever arm 14. The first lever arm 12 includes an intermediate portion 16 having a pivot axis 18 and a cylindrical first coupling hole 20 defined surrounding the pivot axis. A first handle 22 extends from the intermediate portion 16 to a distal handle end 24 of the first lever arm 12. The second lever arm 14 is similar and complementary to the first lever arm 12, and includes an intermediate portion 26 having a pivot axis 28 and a cylindrical second coupling hole 30 defined surrounding the pivot axis 28. A second handle 32 extends from the intermediate portion 26 to a distal handle end 34 of the second lever arm 14. The first and the second handles 22,32 each have a shaped hand guard 36,38, and a hole 40,42 defined at the distal handle ends 24,34 of the first and the second lever arms 12,14, for hanging up the pliers 10 during non-use or attaching a wrist or belt cord for example. Contoured hand grips 44,46 are respectfully provided between the hand guard and the distal handle ends. The first and the second lever arms 12,14 are anodized to resist rusting and extend the useful life of the fishing pliers 10. Although not shown, the first and the second handles 22,32 can also be dipped in plastic or rubber to provide a protective cover or improved grip.

Figure 4:
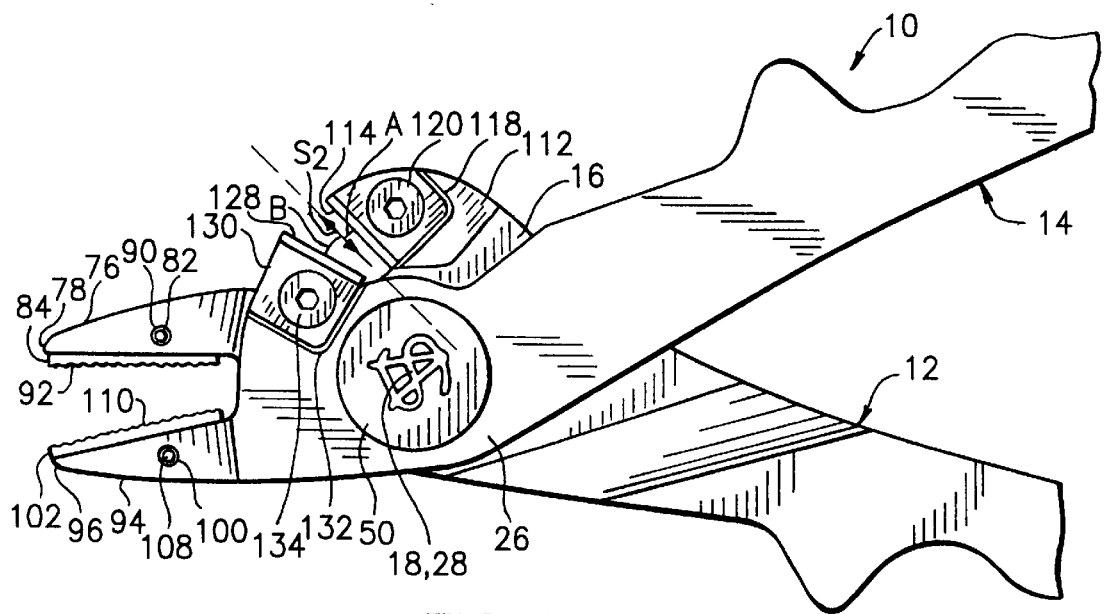
FIG. 4 is a side elevation view, partially cut away, of the fishing pliers in a less open position than shown in FIG. 3.
Figure 3:
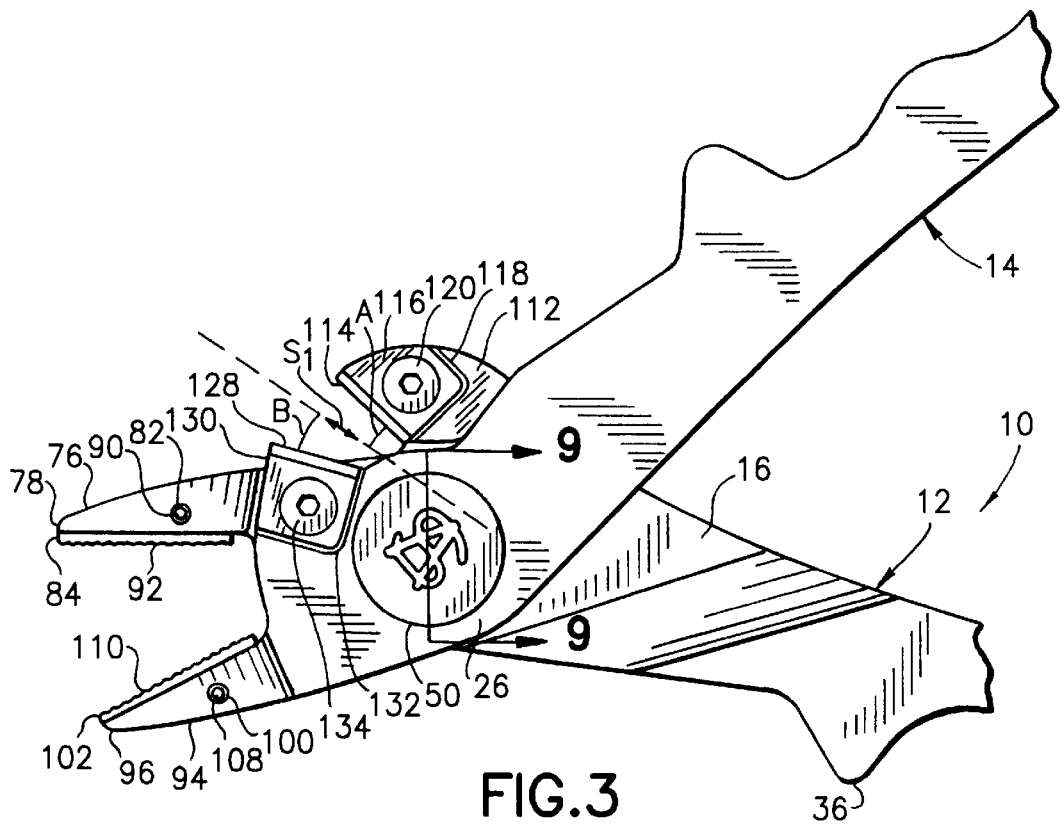
FIG. 3 is a side elevation view, partially cut away, of the fishing pliers shown in an open position.

The first and the second lever arms 12,14 are pivotally coupled along their pivot axes 18,28 for relative pivoting movement between a closed position (FIGS. 2 and 5) and a fully open position (FIG. 3). FIG. 4 shows an intermediary, partially open position. As shown best in FIGS. 1,8 and 9, pivot assembly 60 includes a low friction cylindrical bearing sleeve 62, having a plurality of cylindrical bearings 64 mounted therein, received in the second coupling opening 30 and a portion 66 of the first coupling opening 20. A cylindrical shaft 56 having an enlarged head 58 received in a stepped portion 61 of the first coupling opening 20 is received in the first coupling opening 20 to support the first lever arm 12, and is received in and extends through the bearings 64 and bearing sleeve 62 to pivotally couple the second lever arm 14 to the first lever arm 12. A bolt 48 having an enlarged head 50 received in a stepped portion 52 of the second coupling opening 30 is threadedly received in a threaded bore 54 of shaft 56 to secure the pivot assembly 60 and lever arms 12,14 together. Thus the pivot assembly 60 including the bearing sleeve 62 and bearings 64 provides stable support and smooth, precise pivoting movement with substantially no relative side to side movement between the first and the second lever arms 12,14.

The intermediate portion 26 of the second lever arm 14 defines a circular groove 68 within the stepped portion 52 of the first coupling opening 20 and an o-ring 70 is seated therein under the enlarged head 50 of the bolt 48. The intermediate portion 16 of the first lever arm 12 defines a circular groove 72 around the second coupling opening 30 on a side facing the first lever arm 12 and an o-ring 74 is seated therein. The o-rings 70,74 prevent contaminants such as dirt or water from getting into the bearing sleeve 62, and also permit the bearing sleeve to retain a lubricant. The heads 50,58 have "VS" shaped grooves, which provides a grip to disassemble the pivot assembly 60 for renewing bearings, lubrication and seals, if necessary.

A first gripping jaw 76 extends from the intermediate portion 16 of the first lever arm 12 generally opposite the first handle 22 to a distal jaw end 78 of the first lever arm. As best shown in FIGS. 1,7,8 and 10, the first gripping jaw 76 defines an elongated channel 80 extending from the intermediate portion 16 of the first lever arm 12 to the distal jaw end 78 of the first lever arm and also defines a bore 82 generally traverse to and intersecting the channel. A replaceable first gripping insert 84 has an elongated spline 86 received within the channel 80 of the first gripping jaw 76 and the spline defines a traverse bore 88 in alignment with the bore 82 defined by the first gripping jaw. A first pin 90 is wedged within the bore 82 of the first gripping jaw 76 and the bore 88 of the spline 86 to secure the first gripping insert 84 to the first gripping jaw. As shown in FIG. 11, the first gripping insert 84 has a knurled gripping surface 92 that has progressively finer knurling nearer the distal jaw end 78 of the first lever arm 12.

A second gripping jaw 94 extends from the intermediate portion 26 of the second lever arm 14 generally opposite the second handle 32 to a distal jaw end 96 of the second lever arm. The second gripping jaw 94 defines an elongated channel 98 extending from the intermediate portion 26 of the second lever arm 14 to the second distal end 96 of the second lever arm and also defines a bore 100 generally traverse to and intersecting the channel. A replaceable second gripping insert 102 has an elongated spline 104 received within the channel 98 of the second gripping jaw 94 and the spline defines a traverse bore 106 in alignment with the bore 100 defined by the second gripping jaw. A second pin 108 is wedged within the bore 98 of the second gripping jaw 94 and the bore 106 of the spline 104 to secure the second gripping insert 102 to the second gripping jaw. The second gripping insert 102 has a knurled gripping surface 110 that has progressively finer knurling nearer the distal jaw end 96 of the second lever arm 14, as shown in FIG. 11 with respect to gripping insert 84.

The second gripping jaw 94 is complementary to the first gripping jaw 76 so that as the first and the second handles 22,32 are squeezed together, the gripping surface 110 of the second gripping insert 102 and the gripping surface 92 of the first gripping insert 84 come together and are placed in butting engagement in the closed position of the pliers 10 (FIG. 2). The progressively finer knurled first and second gripping surfaces 92,110 allow the pliers to better grip small objects using the portion of the gripping jaws 76,94 near the end of the pliers, and provide good friction with larger objects using the coarser knurling further along the length of the jaws, adapting the pliers for use in a number of different tasks. In addition, the first and the second gripping inserts 84,102 can be made of stainless steel to resist rusting and can be easily replaced once they eventually wear out to prolong the useful life of the pliers 10.

Figure 6:
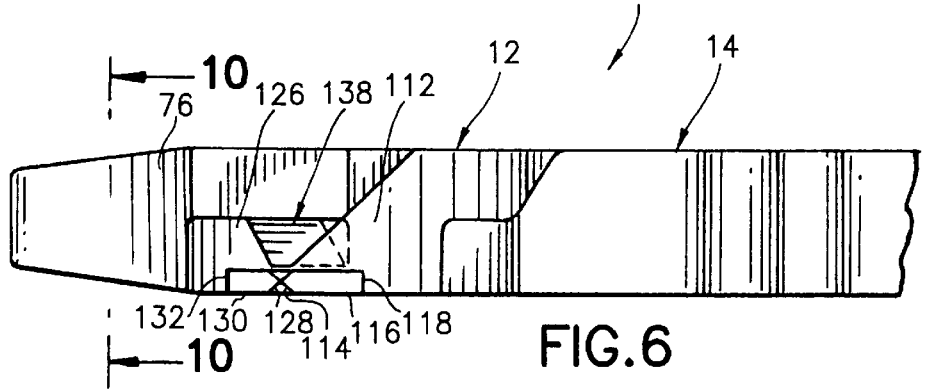
FIG. 6 is a top view, partially cut away, of the fishing pliers.
Figure 7:
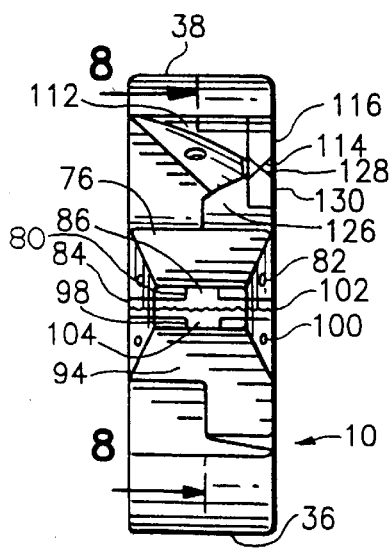
FIG. 7 is an end view of the fishing pliers.

A first cutting jaw 112 is formed with the intermediate portion 16 of the first lever arm 12, and extends from the intermediate portion generally at a forty-five degree angle with the first gripping jaw 76. The first cutting jaw 112 has a straight first cutting edge 114 formed as part of a replaceable first cutting blade 116 secured to the first cutting jaw. The first cutting blade 116 is received in a mating pocket 118 defined in the first cutting jaw 112 and secured therein with a recessed screw 120 that passes through a hole 122 defined in the first cutting blade and is threadedly received in a threaded bore 124 defined in the first cutting jaw. The cutting jaw tapers to thinness near the cutting blade, as seen in FIGS. 1, 6 and 7.

A second cutting jaw 126 is formed with the intermediate portion 26 of the second lever arm 14, and extends from the intermediate portion generally at a forty-five degree angle with the second gripping jaw 94. The second cutting jaw 126 has a straight second cutting edge 128 formed as part of a replaceable second cutting blade 130 secured to the second cutting jaw. The second cutting blade 130 is received in a mating pocket 132 defined in the second cutting jaw 126 and secured therein with a recessed screw 134 that passes through a hole 136 defined in the second cutting blade and is threadedly received in a threaded bore 138 defined in the second cutting jaw.

Figure 5:
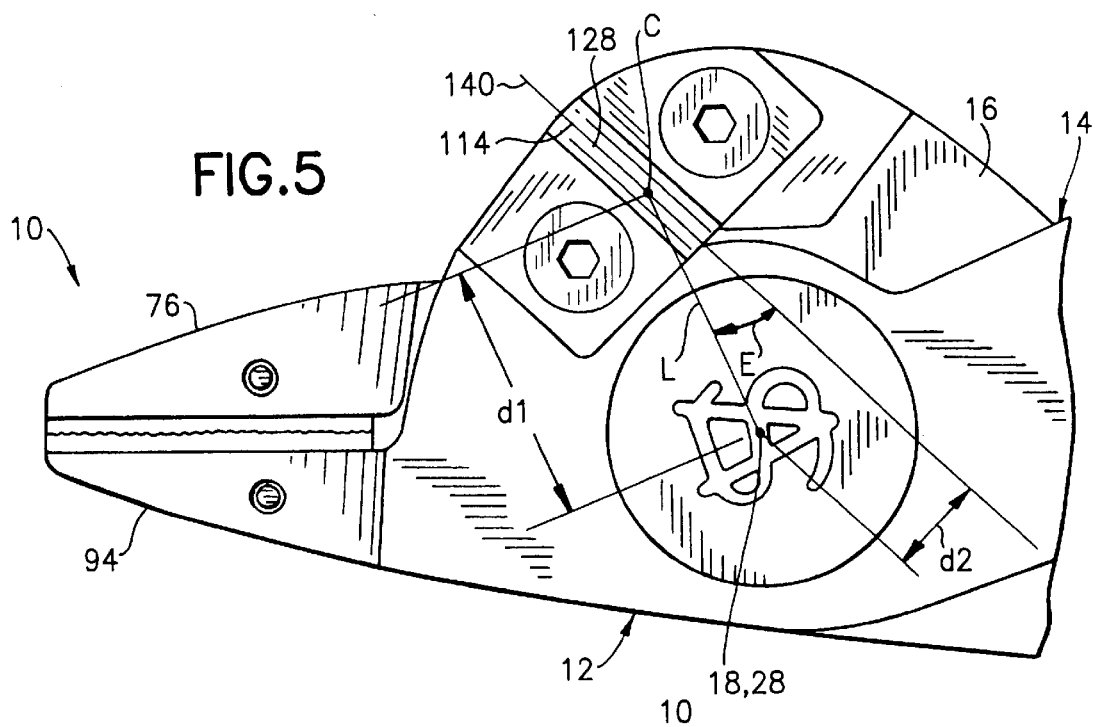
FIG. 5 is an enlarged side elevation view, partially cut away, of the fishing pliers shown in a closed position.

The first and the second cutting edges 114,128 are in butting engagement along a common cutting line 140 when the first and the second lever arms 12,14 are in a closed position (FIGS. 2 and 5). As best shown in FIGS. 6 and 7, the first cutting jaw 112 extends over the second lever arm 14 so that the first cutting blade 116 is aligned with the side of the intermediate portion 26 of the second lever arm facing away from the first lever arm 12, and the first cutting jaw tapers toward the cutting line. The second cutting jaw 126 is also tapered toward the cutting line and the second cutting blade 130 is also aligned with the side of the intermediate portion 26 of the second lever arm 14 facing away from the first lever arm 12, wherein the first and the second cutting edges 114,128 are configured as side cutters. A side cutter configuration is beneficial because it allows the cutting edges 114,128 to be pressed closely against a surface and cut off more of an object extending from that surface. The first and the second cutting blades 116,130 taper to thin sharp cutting edges 114,128, and the first and the second cutting blades 116,130 can be made of stainless steel for strength and to resist rusting. They can be easily replaced once they eventually wear out.

As best shown in FIG. 5, the first and the second cutting edges 114,128 are positioned so that their common cutting line 140 is offset from the coupled pivot axes 18,28 of the first and the second lever arms 12,14 by the distance $d_2$. Because of the offset, both a relative slicing motion and a relative compressive motion are produced between the first and the second cutting edges as the first and the second lever arms are closed from the position shown in FIG. 3, to the closed position in FIG. 5. The relative slicing motion is indicated in FIGS. 3 and 4 by the arrows $S_1$ and $S_2$, respectively, where A is the approximate midpoint of cutting edge 114 and B is the approximate midpoint of cutting edge 128. Points A and B come together at point C of FIG. 5 when the cutting jaws 112,126 are closed. In FIG. 3, the arrow $S_1$ extends along the ultimate closure line 140 of the blades, and the arrow $S_1$ further extends between the intersection of lines normal to the cutting edges 114,128 and the closure line 140, thereby indicating the distance of "slicing" relative motion between the cutting edges as they close from the position shown in FIG. 3.

The arrow $S_2$ similarly indicates the distance of "slicing" relative motion between the cutting edges 114,128 as they close from the position shown in FIG. 4. Of course, the arrow $S_2$ is shorter than the arrow $S_1$, because some slicing relative motion takes place between the position shown in FIG. 3 and the position shown in FIG. 4.

The relative slicing motion in addition to the relative compressive motion is beneficial because it reduces the amount of force necessary to cut an object and reduces wear on the first and the second cutting edges 114,128 by distributing the cutting forces, and produces a clean cut. The amount of relative slicing motion can be increased by increasing the offset between the common cutting line 140 and the pivot axes 18,28, and/or moving the cutting blades further away from the pivot axes. In the particular pliers 10, illustrated in the drawings, a distance $d_1$ between the center point C of the first and the second cutting edges 114,128 when the first and the second lever arms 12,14 are in a closed position and the pivot axes 18,28 of the first and the second lever arms is about sixteen (16) millimeters, and a perpendicular distance $d_2$ between the common cutting line and the pivot axes is about six (6) millimeters, producing about a one-third amount of relative slicing motion and two-thirds relative compressive motion as the cutting blades close. Also, the common cutting line 140 is offset so that an angle E of about 25° is formed between the common cutting line 140 and an imaginary straight line L extending from the pivot axes 18,28 of the first and the second lever arms 12,14 to a center point C of the first and the second cutting edges 114,128. The desired combination of slicing and compressive cutting is achieved when the angle is in a range of about 15° to 55°.

With reference to FIGS. 12 and 13, another fishing pliers 150 is shown in part. The fishing pliers 150 has lever arms 152 and 154 pivotally coupled by a pivot assembly 156. The lever arms 152 and 154 are similar to the lever arms 12 and 14 described above, having gripping jaws 76,94 and cutting jaws 112,126, respectively. The gripping and cutting inserts have not been shown in FIG. 12 for simplicity, but are the same or similar to those described above.

The pivot assembly 156 includes bushings 160,162, pivot shaft 56 with enlarged head 58a, and bolt 48 with head 50a. The bushing 160 is bronze, and includes a cylindrical body 164 having a bore 166 therethrough, and an annular flange 168 extending from the body 164. A groove 170 is formed in the outside end surface 172, to receive O-ring 174. Bushing 162 is the same as bushing 160, with reversed orientation in the pivot assembly 156.

The lever arm 152 has a intermediate portion 176 with a stepped bore 178 therethrough, the bore 178 being coaxial with the pivot axis 180 of the pliers 150. The lever arm 154 also has an intermediate section 182 with stepped bore 184 coaxial with the pivot axis 180.

With particular reference to FIG. 12, the cylindrical body 164 of bushing 160 is press fit into the smaller diameter portion 177 of stepped bore 178 of lever arm 152, and the cylindrical body of bushing 162 is similarly press fit into bore 184 of lever arm 154. Thus, the bushings are fixed with respect to their respective lever arms. Groove 186 in lever arm 154 and O-ring 187 seal the abutting ends of the bushings.

Pivot shaft 56 is received in the aligned central bores of the bushings 160,162, and the pivot assembly 156 and the lever arms 152,154 are secured together by bolt 48. The enlarged head 50a of bolt 48 and the flange 168 of bushing 160 are accommodated in the larger diameter portion 179 of stepped bore 178, and the enlarged head 58a of shaft 56 and the flange of bushing 162 are accommodated in the larger diameter portion of stepped bore 184. Thus the bushings 160,162 rotate on shaft 56 as the lever arms open and close. The interface between the bushings 160,162 and shaft 56 are protected from moisture and dirt by O-rings 174,188 respectively positioned at the outer end surfaces of bushings 160,162. The enlarged heads 50a and 58a have a plurality of openings 190, which receive a mating tool to assemble and disassemble the pivot assembly 156.

The pivot assembly 156 provides a substantial area of close-tolerance interface between the lever arms 152,154, which supports the lever arms 152,154 with respect to each other in a solid manner. This interface prohibits or greatly diminishes any twisting displacement between the lever arms, so that the gripping jaws and cutting jaws have the desired positioning during use.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A pliers comprising:

a first lever arm including an intermediate portion having a pivot axis, and a handle extending from the intermediate portion;

a second lever arm generally complementary to the first lever arm and including an intermediate portion having a pivot axis, and a handle extending from the intermediate portion, the first and the second lever arms coupled along their pivot axes for relative pivoting movement between an open position and a closed position;

a first cutting jaw formed with the intermediate portion of the first lever arm, the first cutting jaw having a first cutting edge; and a second cutting jaw formed with the intermediate portion of the second lever arm generally opposed to the first cutting jaw, the second cutting jaw having a second cutting edge, the first and the second cutting edges placed in butting engagement along a common cutting line when the first and the second lever arms are in a closed position;

the first and the second cutting edges positioned so that their common cutting line is offset from the coupled pivot axes of the first and the second lever arms, whereby both a relative slicing motion and a relative compressive motion are produced between the first and the second cutting edges as the lever arms are opened and closed.

2. The pliers according to claim 1 wherein:

an imaginary straight line extends from the pivot axes of the first and the second lever arms to an approximate center point of the first and the second cutting edges when the first and the second lever arms are in a closed position; and an angle formed between the common cutting line and said imaginary straight line is in a range of about 15°–55°.

3. The pliers according to claim 2 wherein:

an imaginary straight line extends from the pivot axes of the first and the second lever arms to a center point of the first and the second cutting edges when the first and the second lever arms are in a closed position; and an angle formed between the common cutting line and said imaginary straight line is substantially 25°.

4. The pliers according to claim 3 wherein the first and second lever arms are coupled by a pivot assembly including a bearing sleeve and bearings, a shaft extending through the bearings, the shaft secured to hold the first and second lever arms together.

5. The pliers according to claim 3 wherein the first and second lever arms are coupled by a pivot assembly including:

a first bushing press fit into an opening in the first lever arm and defining a bore therethrough;

a second bushing press fit into an opening in the second lever arm and defining a bore therethrough aligned with the bore of the first bushing;

a shaft inserted through the aligned bores of the bushings and including an enlarged head; and a bolt received in a threaded opening in the shaft and including an enlarged head, the bushings and lever arms secured together between the enlarged heads of the shaft and bolt.

6. The pliers according to claim 5 wherein the bushings each have a cylindrical body portion press fit into their respective lever arms, and each have an annular flange positioned adjacent the enlarged heads of the shaft and bolt, respectively.

7. The pliers as defined in claim 6 and further comprising:

an O-ring positioned between the first and second lever arms surrounding the bushings;

an O-ring between each of the enlarged heads of the shaft and bolt and the adjacent bushing, thereby sealing the interface between the shaft and the bushings.

8. The pliers according to claim 2 wherein the first and second lever arms are coupled by a pivot assembly including a bearing sleeve and bearings, a shaft extending through the bearings, the shaft secured to hold the first and second lever arms together.

9. The pliers according to claim 1 wherein the first cutting edge is formed as part of a first cutting blade secured to the first cutting jaw, and the second cutting edge is formed as part of a second cutting blade secured to the second cutting jaw.

10. The pliers according to claim 9 wherein the first and the second cutting blades are received in mating pockets defined in the first and the second cutting jaws.

11. The pliers according to claim 9 wherein the first and the second cutting blades are made of stainless steel.

12. The pliers according to claim 9 wherein the first and the second cutting blades are secured to the first and the second cutting jaws with screws.

13. The pliers according to claim 9 wherein the first and the second cutting edges are positioned on a side of the pliers.

14. The pliers according to claim 1 wherein the first and the second cutting edges are positioned on a side of the pliers.

15. The pliers according to claim 1 wherein the first and second lever arms are coupled by a pivot assembly including a bearing sleeve received in an opening defined by one of the first and second lever arms, bearings carried by the bearing sleeve, and a shaft extending through the bearings and through an opening in the other of the first and second lever arms, the shaft secured to hold the first and second lever arms together.

16. The pliers according to claim 15 wherein the shaft has an enlarged head engaged by one of the first and second lever arms and the shaft defines a threaded axial opening receiving a threaded bolt having an enlarged head engaged by the other of the first and second lever arms, thereby securing the first and second lever arms together.

17. The pliers according to claim 1 wherein the first and second lever arms are coupled by a pivot assembly including:

a first bushing press fit into an opening in a first lever arm and defining a bore therethrough;

a second bushing press fit into an opening in the second lever arm and defining a bore therethrough aligned with the bore of the first bushing;

a shaft inserted through the aligned bores of the bushings and including an enlarged head of the shaft; and a bolt received in a threaded opening in the shaft and including an enlarged of the bolt, the bushings and lever arms secured together between the enlarged heads of the shaft and bolt.

18. The pliers according to claim 17 wherein the bushings each have a cylindrical body portion press fit into their respective lever arms, and each have an annular flange positioned adjacent the enlarged heads of the shaft and bolt, respectively.

19. The pliers as defined in claim 18 and further comprising:

an O-ring positioned between the first and second lever arms surrounding the bushings;

an O-ring between each of the enlarged heads of the shaft and bolt and the adjacent bushing, thereby sealing the interface between the shaft and the bushings.

20. The pliers according to claim 1 further comprising:

a first gripping jaw extending from the intermediate portion of the first lever arm generally opposite the first handle and having a gripping surface; and a second gripping jaw extending from the intermediate portion of the second lever arm generally opposite the second handle and complementary to the first gripping jaw and having a gripping surface, the gripping surface of the second gripping jaw placed in butting engagement with the gripping surface of the second gripping jaw when the first and the second lever arms are in a closed position.

21. The pliers according to claim 1 wherein the first lever arm and the second lever arm are made of aluminum.

22. A pliers comprising:

a first lever arm including an intermediate portion having a pivot axis, and a handle extending from the intermediate portion to a distal handle end of the first lever arm;

a second lever arm complementary to the first lever arm and including an intermediate portion having a pivot axis, and a handle extending from the intermediate portion to a distal handle end of the second lever arm, the first and the second lever arms coupled along their pivot axis for relative pivoting movement between an open position and a closed position;

a first gripping jaw extending from the intermediate portion of the first lever arm to a distal jaw end of the first lever arm, generally opposite the first handle, the first gripping jaw defining a channel extending from the intermediate portion of the first lever arm to the distal jaw end of the first gripping jaw;

a first gripping insert having a gripping surface, the first gripping insert having a spline received and secured within the channel of the first gripping jaw;

a second gripping jaw extending from the intermediate portion of the second lever arm to a distal jaw end of the second lever arm, generally opposite the second handle and complementary to the first gripping jaw, the second gripping defining a channel extending from the intermediate portion of the second lever arm to the distal jaw end of the second gripping jaw;

a second gripping insert having a gripping surface placed in butting engagement with the gripping surface of the first gripping insert when the first and the second lever arms are in a closed position, the second gripping insert having a spline received and secured within the channel of the second gripping jaw;

wherein the first and second lever arms are coupled by a pivot assembly including:
   a first bushing press fit into an opening in the first lever arm and defining a bore therethrough;
   a second bushing press fit into an opening in the second lever arm and defining a bore therethrough aligned with the bore of the first bushing;
   a shaft inserted through the aligned bores of the bushings and including an enlarged head; and
   a bolt received in a threaded opening in the shaft and including an enlarged head, the bushings and the lever arms secured together between the enlarged heads of the shaft and bolt.

23. The pliers according to claim 22 wherein:
the first gripping jaw defines a bore generally traverse to and intersecting the channel defined by the first gripping jaw, the spline of the first gripping insert defines a traverse bore in alignment with the bore defined by the first gripping jaw, and a first pin is wedged within the bore of the first gripping jaw and the bore of the spline to secure the first gripping insert to the first gripping jaw; and the second gripping jaw defines a bore generally traverse to and intersecting the channel defined by the second gripping jaw, the spline of the second gripping insert defines a traverse bore in alignment with the bore defined by the second gripping jaw, and a second pin is wedged within the bore of the second gripping jaw and the bore of the spline of the second gripping insert to secure the second gripping insert to the second gripping jaw.

24. The pliers according to claim 23 wherein the gripping surfaces of the first and the second gripping inserts are knurled.

25. The pliers according to claim 24 wherein the gripping surfaces of the first and the second gripping inserts are progressively more finely knurled nearer the distal jaw ends of the first and the second lever arms.

26. The pliers according to claim 25 wherein the first and the second gripping inserts are made of stainless steel.

27. The pliers according to claim 23 wherein the first lever arm and the second lever arm are made of aluminum.

28. The pliers according to claim 22 wherein the gripping surfaces of the first and the second gripping inserts are knurled.

29. The pliers according to claim 22 wherein the gripping surfaces of the first and the second gripping inserts are progressively more finely knurled nearer the distal jaw ends of the first and the second lever arms.

30. The pliers according to claim 22 further comprising:
a first cutting jaw formed with the intermediate portion of the first lever arm, the first cutting jaw having a first cutting edge; and a second cutting jaw formed with the intermediate portion of the second lever arm generally opposed to the first cutting jaw, the second cutting jaw having a second cutting edge, the first and the second cutting edges in butting engagement along a common cutting line when the first and the second lever arms are in a closed position;

the first and the second cutting edges positioned so that their common cutting line is offset from the coupled pivot axes of the first and the second lever arms, whereby both a relative slicing motion and a relative compressive motion are produced between the first and the second cutting edges as the first and the second lever arms are opened and closed.

31. The pliers according to claim 30 wherein:
an imaginary straight line extends from the pivot axes of the first and the second lever arms to the an approximate center point of the first and the second cutting edges when the first and the second lever arms are in a closed position; and an angle formed between the common cutting line and said imaginary straight line is in a range of about 15°–55°.

32. The pliers according to claim 31 wherein:
an imaginary straight line extends from the pivot axes of the first and the second lever arms to a center point of the first and the second cutting edges when the first and the second lever arms are in a closed position; and an angle formed between the common cutting line and said imaginary straight line is substantially 25°.

33. A plier comprising:
a first lever arm including an intermediate portion having a pivot axis, and a handle extending from the intermediate portion to a distal handle end of the first lever arm;

a second lever arm complementary to the first lever arm and including an intermediate portion having a pivot axis, and a handle extending from the intermediate portion to a distal handle end of the second lever arm, the first and the second lever arms coupled along their pivot axis for relative pivoting movement between an open position and a closed position;

a first gripping jaw extending from the intermediate portion of the first lever arm to a distal jaw end of the first lever arm, generally opposite the first handle, a first gripping insert secured to the first gripping jaw and having a gripping surface, a second gripping jaw extending from the intermediate portion of the second lever arm to a distal jaw end of the second lever arm, generally opposite the second handle and complementary to the first gripping jaw, a second gripping insert having a gripping surface placed in butting engagement with the gripping surface of the first gripping insert when the first and the second lever arms are in a closed position, wherein the first and second lever arms are coupled by a pivot assembly including a bearing sleeve received in an opening defined by one of the first and second lever arms, cylindrical bearings carried by the bearing sleeve, and a shaft extending through and supported by the cylindrical bearings and through an opening in the other of the first and second lever arms, the shaft secured to hold the first and second lever arms together.

* * * * *